United States Patent
Tonyan et al.

(10) Patent No.: US 6,620,487 B1
(45) Date of Patent: Sep. 16, 2003

(54) STRUCTURAL SHEATHING PANELS

(75) Inventors: Timothy D. Tonyan, Wheaton, IL (US); David M. Bonen, Skokie, IL (US); Ashish Dubey, Grayslake, IL (US); Kumar C. Natesaiyer, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/721,188

(22) Filed: Nov. 21, 2000

(51) Int. Cl.$^7$ .............................................. B32B 23/02
(52) U.S. Cl. .......................... 428/192; 428/60; 106/735
(58) Field of Search ............... 106/735; 52/293, 52/309; 428/325, 70, 192, 60; 260/29.6

(56) References Cited

U.S. PATENT DOCUMENTS

| | | | | |
|---|---|---|---|---|
| 4,057,526 A | * | 11/1977 | de Rook | 260/29.6 |
| 4,259,824 A | | 4/1981 | Lopez | 52/612 |
| 4,350,533 A | | 9/1982 | Galer et al. | 106/89 |

(List continued on next page.)

FOREIGN PATENT DOCUMENTS

| | | | | |
|---|---|---|---|---|
| EP | 271329 A2 | 6/1988 | | C04B/7/32 |
| GB | 1493203 | 11/1977 | | C03C/3/30 |
| JP | 53034819 | 3/1978 | | B28B/3/20 |
| JP | 54013535 | 2/1979 | | C04B/31/00 |
| JP | 5499126 | 8/1979 | | C04B/7/16 |
| JP | 59232950 | 12/1984 | | C04B/13/00 |
| JP | 62238734 A | 10/1987 | | B32B/13/02 |
| JP | 94 096473 B2 | 11/1994 | | C04B/38/10 |
| JP | 2641707 B2 | 8/1997 | | C04B/28/02 |
| RU | 1815462 | 5/1993 | | F16L/9/08 |
| SE | 8603488 | 2/1988 | | E04B/1/94 |
| WO | WO 93/10972 | 6/1993 | | B32B/13/02 |

OTHER PUBLICATIONS

Bentur, A., et al., "Gypsum Of Improved Performance Using Blends With Portland Cement And Silica Fume," *Advances In Cement Research*, vol. 6, No. 23, pp. 109–116 (1994).

Goldman, A., et al., "Properties of Cementitious Systems Containing Silica Fume Or Nonreactive Microfillers," *Advn Cem Bas Mat*, Elsevier Science Inc., [1], pp. 209–215 (1994).

Kovler, K., "Setting And Hardening of Gypsum–Portland Cement–Silica Fume Blends, Part I: Temperature And Setting Expansion," *Cement and Concrete Research*, Elsevier Science Ltd., vol. 28, No. 3, pp. 423–437 (1998).

Singh, Manjit, et al., "Phosphogypsum–Fly Ash Cementitious Binder–Its Hydration And Strength Development," *Cement and Concrete Research*, Elsevier Science Ltd., vol. 25, No. 4, pp. 752–758 (1995).

Zhang, Min–Hong, et al., "Pozzolanic Reactivity Of Lightweight Aggregates," *Cement and Concrete Research*, Pergamon Press plc, vol. 20, pp. 884–890 (1990).

*Primary Examiner*—Harold Pyon
*Assistant Examiner*—Jane Rhee
(74) *Attorney, Agent, or Firm*—John M. Lorenzen; David F. Janci; Jenkens & Gilchrist

(57) ABSTRACT

A reinforced, lightweight, dimensionally stable panel capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

27 Claims, 5 Drawing Sheets

Time (days)

U.S. PATENT DOCUMENTS

| | | | |
|---|---|---|---|
| 4,379,729 A | 4/1983 | Cross | 156/73.6 |
| 4,488,909 A | 12/1984 | Galer et al. | 106/89 |
| 4,494,990 A | 1/1985 | Harris | 106/90 |
| 4,504,320 A | 3/1985 | Rizer et al. | 106/98 |
| 4,661,159 A | 4/1987 | Ortega et al. | 106/89 |
| 4,691,490 A * | 9/1987 | Leaver | 52/293 |
| 4,808,229 A | 2/1989 | Arhelger | 106/90 |
| 4,944,127 A * | 7/1990 | Clear | 52/309 |
| 5,154,874 A | 10/1992 | Koslowski | 264/333 |
| 5,371,989 A | 12/1994 | Lehnert et al. | 52/309.17 |
| 5,439,518 A | 8/1995 | Francis et al. | 106/705 |
| 5,685,903 A | 11/1997 | Stav et al. | 106/735 |
| 5,718,759 A | 2/1998 | Stav et al. | 106/735 |
| 5,858,083 A | 1/1999 | Stav et al. | 106/735 |
| 5,935,699 A * | 8/1999 | Barber | 428/325 |
| 5,958,131 A | 9/1999 | Asbridge et al. | 106/718 |
| 6,187,409 B1 * | 2/2001 | Mathieu | 428/70 |
| 6,197,107 B1 | 3/2001 | Stav et al. | 106/722 |
| 6,241,815 B1 * | 6/2001 | Bonen | 106/735 |

\* cited by examiner

STRUCTURAL SHEATHING PANELS

BACKGROUND OF THE INVENTION

This invention relates generally to panels that are applied to framing in residential and other types of light construction. More particularly, the invention relates to panels that are able to resist lateral forces imposed by high wind and earthquake loads in regions where they are required by building codes. Such panels, commonly known as shear walls or diaphragms, must demonstrate shear resistance as shown in recognized tests, such as ASTM E72.

If one considers a simple box structure having panels fastened to framing, it can be seen that a strong lateral force acting against one side of the box (e.g., wind pressure) will tend to force the side walls resisting that force from a rectangular shape into a parallelogram. Not all sheathing panels are capable of resisting such forces, nor are they very resilient, and some will fail, particularly at points where the panel is fastened to the framing. Where it is necessary to demonstrate shear resistance, the sheathing panels are measured to determine the load which the panel can resist within the allowed deflection without failure.

The shear rating is generally based on testing of three identical 8×8 ft (2.44×2.44 m) assemblies, i.e., panels fastened to framing. One edge is fixed in place while a lateral force is applied to a free end of the assembly until the load is no longer carried and the assembly fails. The measured shear strength will vary, depending upon the thickness of the panel and the size and spacing of the nails used in the assembly. For example, a typical assembly, e.g., a nominal ½ inch (12.7 mm) thick plywood fastened with 8d nails (see the nail description below) to nominal 2×4 inch (50.8×101.6 mm) wood studs spaced 16 inches (406.4 mm) apart (on centers), the nails being spaced 6 inches (152.4 mm) apart on the perimeter and 12 inches (304.8 mm) apart within the perimeter, would be expected to show a shear strength of 720 lbs/ft (1072 kg/m) before failure occurs. (Note that the measured strength will vary as the nail size and spacing is changed, as the ASTM E72 test provides.) This ultimate strength will be reduced by a safety factor, e.g., a factor of three, to set the design shear strength for the panel.

Sheathing panels used where a shear rating must be met usually are plywood or oriented strand board (OSB), which consist of pieces of wood that are glued together. These panels can provide the needed shear strength, but each is combustible and neither is durable when exposed to water. A panel made of hydraulic cement will resist water, but is much heavier than the wood panels and has insufficient shear strength. It is believed that there is no panel currently available which can provide the necessary shear strength, while avoiding the deficiencies of plywood or OSB panels.

As the thickness of the board affects its physical and mechanical properties, e.g., weight, load carrying capacity, racking strength and the like, the desired properties vary according to the thickness of the board. Thus, the desired properties which a shear rated panel with a nominal thickness of 0.5 inches (12.7 mm) should meet include the following.

The panel when tested according to ASTM 661 and American Plywood Association (APA) Test Method S-1 over a span of 16 inches (406.4 mm) on centers, should have an ultimate load capacity greater than 550 lbs (250 kg) under static loading, an ultimate load capacity greater than 400 lbs (182 kg) under impact loading and a deflection of less than 0.078 inches (1.98 mm) under both static and impact loading with a 200 lb (90.9 kg) load.

The racking shear strength of a 0.5 inch (12.7 mm) thick panel measured by the ASTM E72 test using the nail size and spacing described above should be at least 720 lbs/ft (1072 kg/m).

A 4×8 ft, ½ inch thick panel (1.22×2.4 m, 12.7 mm thick) should weigh no more than 99 lbs (44.9 kg) and preferably no more than 85 lbs (38.6 kg).

The panel should be capable of being cut with the circular saws used to cut wood.

The panel should be capable of being fastened to framing with nails or screws.

The panel should be machinable so that tongue and groove edges can be produced in the panel.

The panel should be dimensionally stable when exposed to water, i.e., it should expand as little as possible, preferably less than 0.1% as measured by ASTM C 1185.

The panel should not be biodegradable or subject to attack by insects or rot.

The panel should provide a bondable substrate for exterior finish systems.

The panel should be non-combustible as determined by ASTM E136.

After curing for 28 days, the flexural strength of a 0.5 inch (12.7 mm) thick panel having a dry density of no more than 65 lb/ft$^3$ (1041 kg/m$^3$) after being soaked in water for 48 hours should be at least 1700 psi (11.7 MPa), preferably at least 2500 psi (17.2 MPa), as measured by ASTM C 947. The panel should retain at least 75% of its dry strength.

It should be evident that plywood and OSB panels meet some, but not all, of the above performance characteristics. Thus, there is a need for improved panels which can meet the shear rating required in certain locations and which exceed the capability of the currently-used wood-based panels by providing non-combustibility and water durability.

Prior art hydraulic cement-based panels and structures also have not possessed the combination of low density, nailability and cuttability required to enable the panel to be cut or fastened (either nailed or screwed) with conventional carpentry tools.

The panels of the invention may generally be described as gypsum-cement compositions reinforced with glass fibers and, with the addition of microspheres, having reduced weight compared with hydraulic cement panels. The panels will satisfy performance requirements listed above and may be distinguished from other compositions to be discussed below which contain similar components, but are not capable of meeting the desired performance.

Gypsum-cement compositions are disclosed generally in U.S. Pat. Nos. 685,903; 5,858,083 and 5,958,131. In each patent, pozzolans are added, silica fume in the '903 and '803 patents and metakaolin in the '131 patent. Aggregates and fiber additions are suggested, but panels meeting the requirements of the invention are not described.

Although glass fibers have been used to reinforce cement, they are known to lose strength with time since the glass is attacked by the lime present in cured cement. This may be offset, to some extent, by coating the glass fibers or by using a special alkali-resistant glass. Other fibers have been suggested to reinforce cement, such as metal fibers, wood or other cellulose fibers, carbon fibers, or polymer fibers.

Cement-based panels and structures have also contained lightweight particles of glass, ceramics and polymers in order to reduce weight, but at the expense of reduced strength. Other aggregates have been suggested, but they will not have the advantages of the lightweight particles.

In U.S. Pat. No. 4,379,729, three layers are used in panels intended to replace wood for concrete forms. The outer two layers are glass fiber reinforced cement, while the middle layer is cement containing hollow spheres. While such panels are subject to static loading, they are not required to meet the building code requirements where wind and earthquake loads are expected.

In Russian Patent No. SU 1815462, three layers are also used in making pipe, rather than panels. Again, the outer layers are made of glass fiber reinforced cement, while the middle layer contains both glass fiber and glass spheres.

A thick modular wall section, rather than a shear rated panel, is discussed in U.S. Pat. No. 4,259,824. Various aggregates, including glass fibers, are suggested to be useful.

In U.S. Pat. No. 5,154,874, a gypsum board including paper fibers is disclosed.

A gypsum-cement panel is discussed in Canadian Patent No. CA 2,192,724. The panel contains 10 to 35 wt. % of wood or paper fibers, rather than glass fibers. Similarly, in U.S. Pat. No. 5,371,989, a gypsum board is disclosed which has glass fiber mats on the exterior surfaces.

In International Publication No. WO 93/10972, an interior panel is described which includes low density aggregates surrounded with cement and disposed within a foamed cement continuous phase. The panels may include glass fibers.

Cellulose or glass fibers are suggested to replace asbestos fibers in cement panels in U.S. Pat. No. 4,808,229.

A layered panel is disclosed in Japanese Patent No. JP 62-238734A. Microspheres are used inside the panel, while cement reinforced with carbon or plastic fibers is used on the outer surfaces.

In U.S. Pat. No. 4,504,320, a glass-reinforced Portland cement is described that includes fly ash cenospheres and silica fume.

It will be evident from the above discussion that fiber reinforcement of cement has been used and that microspheres of glass, ceramic and polymer have been included to reduce weight. Other examples are found in Japanese Patent Nos. JP-2641707 B2, JP 53-034819, JP 54-013535 and JP 94-096473 B2, Swedish Patent No. SE 8603488, and U.K. Patent No. GB 1493203.

Despite all the effort which has gone into the reinforcement of cement, as indicated by the various patents and patent applications mentioned above, the present inventors believe that none of the panels currently available are able to replace plywood or OSB panels in applications where they must meet code required resistance to shear loads or have similar handling characteristics, e.g., cutting and nailing. In the following discussion, it will be shown that a gypsum-cement panel can be made which is capable of satisfying or exceeding the shear loadings now only possible with plywood or OSB panels.

The present invention achieves the combination of low density and ductility required for panel handling and nailability in one of the following three ways:

The use of lightweight ceramic microspheres uniformly distributed throughout the full thickness of the panel.

The use of a blend of lightweight ceramic and polymer microspheres throughout the full thickness of the panel, alternatively adjusting the amount of water used in forming the panel to provide an effect similar to that of polymer microspheres, or a combination thereof.

Creating a multi-layer panel structure containing at least one outer layer having improved nailability and cuttability. This is provided by using a higher water-to-reactive powder (defined below) ratio in making the outer layer(s) relative to the core of the panel or by incorporating lightweight polymer microspheres in substantial quantities in the outer layer(s) relative to the core of the panel, while the inner core corresponds to the previously described panels.

SUMMARY OF THE INVENTION

The first embodiment of the present invention is a lightweight, dimensionally stable panel reinforced with alkali-resistant glass fibers and containing ceramic microspheres. In the panel, the glass fibers and ceramic microspheres are uniformly distributed throughout a continuous phase comprising a cured aqueous mixture of reactive powders, i.e., calcium sulfate alpha hemihydrate, hydraulic cement, lime and an active pozzolan. The second embodiment of the present invention is a lightweight, dimensionally stable panel reinforced with alkali-resistant glass fibers and containing microspheres, which may be a blend of ceramic and polymer microspheres uniformly distributed throughout the continuous phase for the full thickness of the panel. Alternatively, the water-to-reactive powder ratio may be increased to achieve an effect similar to adding polymer microspheres, which may be replaced in whole or in part. The third embodiment of the present invention is a lightweight, dimensionally stable panel reinforced with alkali-resistant glass fibers using a multi-layer structure in which a core has one or two outer facing layers. In this embodiment, the outer layer (or layers) incorporates lightweight polymer microspheres in substantial quantities in a second continuous phase reinforced with glass fibers, the outer layer (or layers) disposed on a core having either ceramic microspheres or a blend of both ceramic and polymer microspheres uniformly distributed throughout a continuous phase, such blend optionally being determined by the water-reactive powder ratio and reinforced with alkali-resistant glass fibers. Alternatively, the outer layer (or layers) may be made with a higher water-to-reactive powder ratio than is used in the core of the panel to achieve an effect similar to adding polymer microspheres, which may be replaced in whole or in part.

In all three embodiments, when the panel is fastened to framing, as provided in the ASTM E72 test, it is capable of meeting or exceeding the shear loading required by building codes where the panels must be able to resist high wind or earthquake forces. The panels may also be used as structural subflooring or as flooring underlayment. In such applications, the panels preferably will employ a tapered tongue and groove joint.

In producing the panel of the first embodiment of the invention, ceramic microspheres are utilized as lightweight fillers. These microspheres are uniformly distributed throughout the full thickness of the panel. In the composition, the dry ingredients are the reactive powders (20 to 55 wt. % hydraulic cement, 35 to 75 wt. % calcium sulfate alpha hemihydrate, 5 to 25 wt. % pozzolan, and 0.2 to 3.5 wt. % lime on a dry basis), ceramic microspheres and alkali-resistant glass fibers, and the wet ingredients are water and superplasticizer. The dry ingredients and the wet ingredients are combined to produce the panel of the first embodiment of the invention. Of the total weight of dry ingredients, the panel of the invention preferably is formed from about 49 to 56 wt. % reactive powders, 35 to 42 wt. % ceramic microspheres and 7 to 12 wt. % alkali-resistant glass fibers. In the broad range, the panel of the invention is formed from about 35 to 58 wt. % reactive powders, 34 to 49 wt. % ceramic microspheres, and 6 to 17 wt. % alkali-resistant glass fibers, based on the total dry ingredients. The amounts of water and superplasticizer added to the dry ingredients are sufficient to accomplish the desired slurry fluidity needed from the processing considerations for any particular manufacturing process. The typical addition rates for water range between 35 to 60% of the weight of reactive powders (water to reactive powders 0.35–0.6/1) and those for superplasticizer range between 1to 8% of the weight of reactive powders. The glass fibers are monofilaments having a diameter of about 5 to 25 microns (micrometers), typically about 10 to 15 microns (micrometers). The monofilaments are bundled in several ways. In one typical configuration 100 fiber strands are combined into rovings containing about 50 strands. Other arrangements are possible. The length of the glass fibers will preferably be about 1 to 2 inches (25 to 50 mm) and broadly about 0.25 to 3 inches (6.3 to 76 mm), and the fiber orientation will be random in the plane of the panel.

In producing the panel of the second embodiment of the invention a blend of ceramic microspheres and polymer microspheres is utilized as lightweight fillers. It has been discovered that incorporation of polymer microspheres in the panel helps to achieve the combination of low density and better nailability required to enable the panel to be cut or fastened (either nailed or screwed) with conventional carpentry tools. Since the water-to-reactive powder ratio also affects density and nailability, it may be adjusted to provide a similar effect to that of the polymer microspheres, although polymer microspheres may be included and need not be completely replaced by adjusting the water-to-reactive powder ratio. It also has been found that the rheological properties of the slurry are improved substantially by utilizing a combination of ceramic and polymer microspheres in the composition. Therefore, in the second embodiment of the invention, the dry ingredients of the composition are the reactive powders described above (i.e., hydraulic cement, calcium sulfate alpha hemihydrate, pozzolan, and lime), ceramic microspheres, polymer microspheres, and alkali-resistant glass fibers, and the wet ingredients of the composition are water and superplasticizer. The dry ingredients and the wet ingredients are combined to produce the panel of the invention. The ceramic and polymer microspheres are uniformly distributed in the matrix throughout the full thickness of the panel. To achieve good fastening and cutting ability, the volume fraction of the polymer microspheres in the panel preferably is in the range of 7 to 15% of the total volume of dry ingredients. Of the total weight of dry ingredients, the panel of the invention preferably is formed from about 54 to 65 wt. % reactive powders, 25 to 35 wt. % ceramic microspheres, 0.5 to 0.8 wt. % polymer microspheres, and 6 to 10 wt. % alkali-resistant glass fibers. In the broad range, the panel of the invention is formed from about 42 to 68 wt. % reactive powders, 23 to 43 wt. % ceramic microspheres, up to 1.0 wt. % polymer microspheres, preferably 0.2 to 1.0 wt. %, and 5 to 15 wt. % alkali-resistant glass fibers, based on the total dry ingredients. The amounts of water and superplasticizer added to the dry ingredients are adjusted to accomplish the desired slurry fluidity needed from the processing considerations for any particular manufacturing process. If desired, additional water may be used instead of polymer microspheres to provide an effect on density and nailability similar to that of the polymer spheres, or both polymer spheres and additional water may be used. The typical addition rates for water range between 35 to 70% of the weight of reactive powders and those for superplasticizer range between 1 to 8% of the weight of reactive powders. If additional water is used, the ratio of water-to-reactive powders will be greater than 0.6/1 (>60% water based on the reactive powders) preferably >0.6/1 to 0.7/1, more preferably 0.65/1–0.7/1. When the ratio of water-to-reactive powders is adjusted to replace polymer spheres, the composition will be adjusted accordingly to produce aqueous mixtures having a consistency suitable for forming a panel of the invention.

The glass fibers are monofilaments having a diameter of about 5 to 25 microns (micrometers), typically about 10 to 15 microns (micrometers). As mentioned above, the monofilaments may be bundled in several ways, for example as 100 fiber strands, which may be combined into rovings containing about 50 strands. The length of the glass fibers preferably is about 1 to 2 inches (25 to 50 mm) and broadly about 0.25 to 3 inches (6.3 to 76 mm), and the fiber orientation will be random in the plane of the panel.

In the third embodiment of the invention, a multi-layer structure in the panel is created where a core has at least one outer layer thereon having improved nailability (fastening ability). This is achieved by incorporating substantial amounts of polymer microspheres in the outer layers, or by using a higher water-to-reactive powder ratio than is used in making the core or by a combination thereof. The core layer of the panel contains hollow ceramic microspheres uniformly distributed throughout the layer thickness or in some embodiments a blend of ceramic and polymer microspheres. As in the second embodiment, the water-to-reactive powder ratio in the core may be adjusted to provide a similar effect to that of the polymer microspheres.

However, the core should be made stronger than the outer layers and in general, the amount of polymer spheres used or the water-to-reactive powder ratio will be chosen so that the core of the panel has better nailability than one having only ceramic microspheres, but provides suitable shear strength. The dry ingredients of the core layer are the reactive powders discussed above (i.e., hydraulic cement, calcium sulfate alpha hemihydrate, pozzolan, and lime), microspheres (ceramic alone or a blend of ceramic and polymer microspheres) and alkali-resistant glass fibers, and the wet ingredients of the core layer are water and superplasticizer. The dry ingredients and the wet ingredients are combined to produce the core layer of the panel of the invention. Of the total weight of dry ingredients, the core layer of the panel of the invention preferably is formed from about 49 to 56 wt. % reactive powders, 35 to 42 wt. %. ceramic microspheres and 7 to 12 wt. % alkali-resistant glass fibers or alternatively, about 54 to 65 wt. % reactive powders, 25 to 35 wt. % ceramic microspheres, 0.5 to 0.8 wt. % polymer microspheres, and 6 to 10 wt. % alkali-resistant glass fibers. In the broad range, the outer layer(s) of a multi-layer panel or core layer of the panel of the invention is formed from about 35 to 58 wt. % reactive powders, 34 to 49 wt. % ceramic microspheres, and 6 to 17 wt. % alkali-resistant glass fibers based on the total dry ingredients or alternatively, about 42 to 68 wt. % reactive powders, 23 to 43 wt. % ceramic microspheres, up to 1.0 wt. % polymer microspheres, preferably 0.2 to 1.0 wt. %, and 5 to 15 wt. % alkali-resistant glass fibers. The amounts of water and superplasticizer added to the dry ingredients are adjusted to accomplish the desired slurry fluidity needed from the processing considerations for any particular manufacturing process. The typical addition rates for water range between 35 to 70% of the weight of reactive powders and those for superplasticizer range between 1 to 8% of the weight of reactive powders.

The dry ingredients of the outer layer(s) are the reactive powders (hydraulic cement, calcium sulfate alpha hemihydrate, pozzolan, and lime), ceramic microspheres, polymer microspheres and alkali-resistant glass fibers, and the wet ingredients of the outer layer(s) will be water and superplasticizer. The dry ingredients and the wet ingredients are combined to produce the outer layer(s) of the panel of the invention. In the outer layer(s) of the panel, where polymer microspheres are incorporated in substantial quantities to furnish good fastening and cutting ability to the panel, the volume fraction of the polymer microspheres in the outer layers of the panel preferably is in the range of 7 to 15% of the total volume of dry ingredients. Of the total weight of dry ingredients, the outer layers of the panel of the invention preferably are formed from about 54 to 65 wt. % reactive powders, 25 to 35 wt. % ceramic microspheres, 0.5 to 0.8 wt. % polymer microspheres, and 6 to 10 wt. % alkali-resistant glass fibers. In the broad range, the outer layer(s) will be formed from about 42 to 68 wt. % reactive powders, 23 to 43 wt. % ceramic microspheres, up to 1.0 wt. % polymer microspheres, and 5 to 15 wt. % alkali-resistant glass fibers, based on the total dry ingredients. The amounts of water and superplasticizer added to the dry ingredients will be adjusted to accomplish the desired slurry fluidity needed from the processing considerations for any particular manufacturing process. The typical addition rates for water will range between 35 to 70% of the weight of reactive powders (greater than 60% if intended to improve nailability) and those for superplasticizer will range between 1 to 8% of the weight of reactive powders. The preferred thickness of the outer layer(s) ranges between $1/32$ to $4/32$ inches (0.8 to 3.2 mm). If only one outer layer is used, it should be less than $3/8$ of the total thickness of the panel.

In both the core and outer layer(s), the glass fibers are monofilaments having a diameter of about 5 to 25 microns (micrometers), typically about 10 to 15 microns (micrometers). The monofilaments may be bundled in several ways, for example as 100 fiber strands, which may be combined into rovings containing about 50 strands. The fiber length will preferably be about 1 to 2 inches (25 to 50 mm) and broadly about 0.25 to 3 inches (6.3 to 76 mm), and the fiber orientation will be random in the plane of the panel.

In another aspect, the invention is a method for making the shear resistant panels just described. An aqueous slurry of the reactive powders (i.e., calcium sulfate alpha hemihydrate, hydraulic cement, active pozzolan and lime), and the microspheres (ceramic alone or a blend of ceramic and polymer microspheres) is prepared and then deposited in thin layers in a panel mold while combining the slurry with short chopped glass fibers, and producing a uniformly mixed core material. In the third embodiment, all layers (i.e., core, and one or two outer layers) of the panel are formed using the same procedure. The aqueous slurry for the core layer contains either only ceramic microspheres or a blend of ceramic and polymer microspheres, the slurry for the outer layers contains polymer microspheres in larger quantities than are used in the core, in order to provide outer layers which have good nailability, while providing suitable shear strength to the core layer.

DESCRIPTION OF THE ILLUSTRATIVE EMBODIMENTS

Figure 1A:
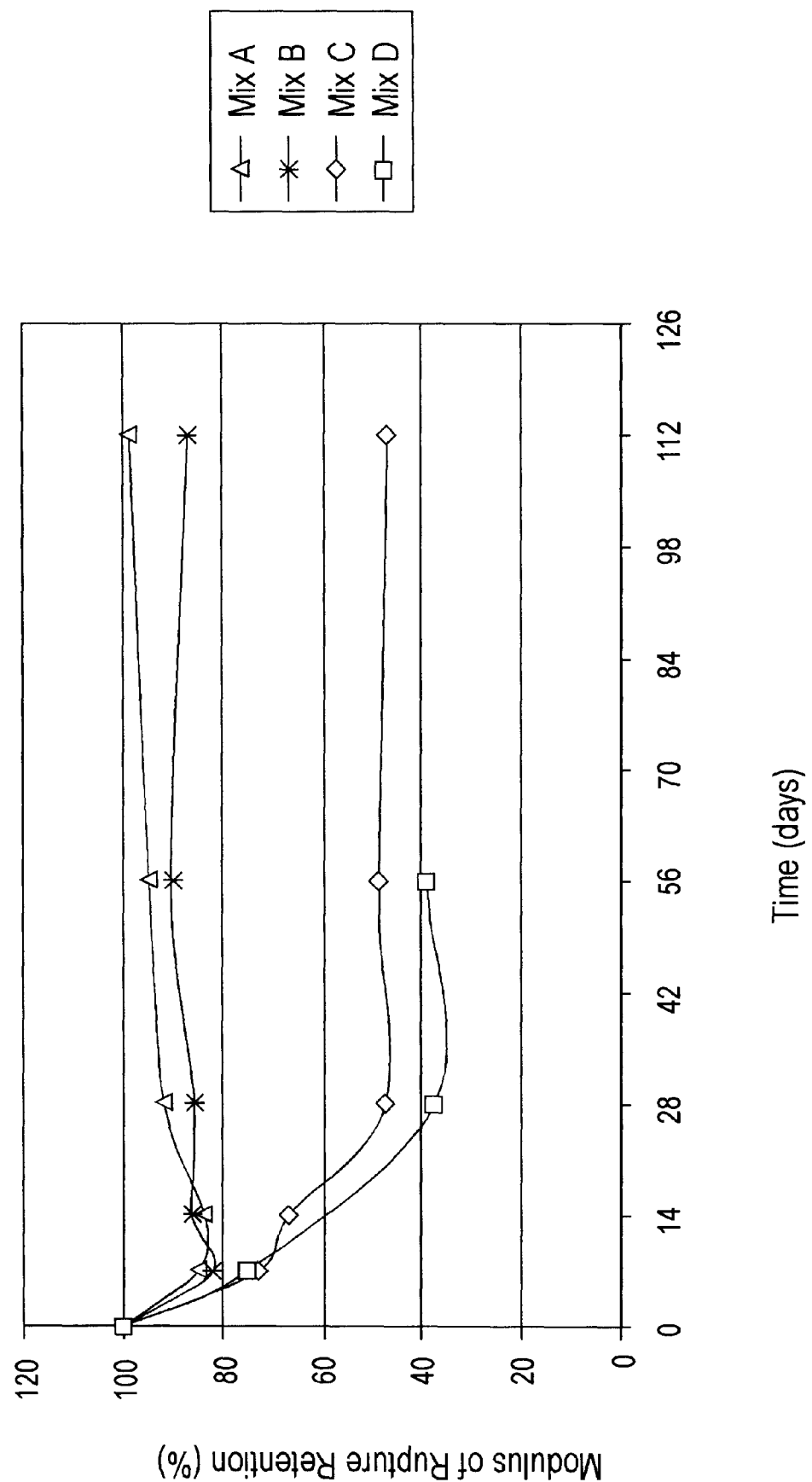
FIGS. 1A and B are graphical presentations of the results of the tests of Example 6.

As previously discussed, there is a need for building panels which can replace plywood and oriented strand board where it is necessary to satisfy building codes which require resistance to shearing forces resulting from high wind or earthquake loadings. Where such performance is not needed, ordinary sheathing panels, such as paper-faced gypsum sheathing, glass mat-faced gypsum sheathing and non-structural cement-based panels, may be used because such panels are not designed to carry shearing forces. Plywood and OSB panels can provide the necessary shearing load performance, but they are not dimensionally stable when subject to water and can be attacked by rot or insects. Further, when plywood and OSB panels are used, it is necessary to protect them against moisture by applying additional water-resistant panels over them, at significant additional cost. Thereafter, an exterior finishing layer may be applied. In contrast, the panels of the invention are water-resistant, non-combustible, dimensionally stable, and strong enough to replace the two layers required when plywood or OSB sheathing panels are used and an exterior finishing layer, such as stucco, can be directly applied to the new panels. The panels can be cut with tools used for wood panels and fastened to framing with nails or screws. Where desirable, tongue and groove construction is possible. The principal starting materials used to make panels of the invention are calcium sulfate alpha hemihydrate, cement, pozzolanic materials, alkali-resistant glass fibers, ceramic microspheres, and polymer microspheres.

Calcium Sulfate Hemihydrate

Calcium sulfate hemihydrate used in panels of the invention is made from gypsum ore, a naturally occurring mineral, (calcium sulfate dihydrate $CaSO_4.2H_2O$). Unless otherwise indicated, "gypsum" will refer to the dihydrate form of calcium sulfate. After being mined, the raw gypsum is thermally processed to form a settable calcium sulfate, which can be anhydrous, but usually is the hemihydrate, $CaSO_4.1/2H_2O$. The hemihydrate has two recognized morphologies, termed alpha hemihydrate and beta hemihydrate. These are selected for various applications based on their physical properties and cost. Both forms react with water to form the dihydrate of calcium sulfate. The beta hemihydrate forms less dense microstructures and is preferred for low density products. The alpha hemihydrate forms more dense microstructures having higher strength and density than those formed by the beta hemihydrate. The alpha hemihydrate is preferred for the sheathing panels of the invention because it has been found that reactive powder blends containing calcium sulfate alpha hemihydrate, hydraulic cement, pozzolan, and lime in quantities according to the invention produce panels having enhanced long-term durability.

Hydraulic Cement

ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention. The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, that is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). The other compounds that are present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention, because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the invention. The slag cements and the calcium sulfoaluminate cement have low alkalinity and are also preferred to make the panels of the invention.

Fibers

Glass fibers are commonly used as insulating material, but they have also been used as reinforcing materials with various matrices. The fibers themselves provide tensile strength to materials which may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. It has been found that glass fiber reinforced cements do lose strength as time passes, which has been attributed to attack on the glass by the lime which is produced when cement is cured. One possible way to overcome such attack is to cover the glass fibers with a protective layer, such as a polymer layer. In general, such protective layers may resist attack by lime, but it has been found that the strength is reduced in panels of the invention and, thus, protective layers are not preferred. A more expensive way to limit lime attack is to use special alkali-resistant glass fibers (AR glass fibers), such as Nippon Electric Glass (NEG) 350Y. Such fibers have been found to provide superior bonding strength to the matrix and are, thus, preferred for panels of the invention. The glass fibers are monofilaments which have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, preferably 1 to 2 inches (25 to 50 mm).

Although they do not provide strength equivalent to glass fibers, it is possible to include some polymer fibers in the panels of the invention. Such polymer fibers, for example polypropylene, polyethylene, polyacrylonitrile and polyvinyl alcohol fibers, are less expensive than alkali-resistant glass fibers and are not subject to attack by lime.

Pozzolanic Materials

As has been mentioned, most Portland and other hydraulic cements produce lime during hydration (curing). It is desirable to react the lime in order to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as ". . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, a finely divided amorphous silica which is the product of silicon metal and ferro-silicon alloy manufacture. Characteristically, it has a very high silica content and a low alumina content. Various natural and man-made materials have been referred to as having pozzolanic properties, including pumice, perlite, diatomaceous earth, tuff, trass, metakaolin, microsilica, ground granulated blast furnace slag and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (i.e., hydraulic cement, calcium sulfate alpha hemihydrate, silica fume, and lime). If other pozzolans are substituted, the amounts used will be chosen to provide chemical performance similar to silica fume.

Lightweight Fillers/Microspheres

Two types of microspheres are utilized in panels of the invention. These are:
Ceramic microspheres, and
Polymer microspheres
Microspheres serve an important purpose in the panels of the invention, which would otherwise be heavier than is desirable for building panels. Used as lightweight fillers, the microspheres help to lower the average density of the product. It is preferred that sufficient fraction of the composition be microspheres so that the weight of a typical ½ inch thick, 4×8 ft panel (12.7 mm thick, 1.31×2.62 m) is less than about 99 lbs (44.9 kg), preferably no more than 85 lb (38.6 kg). When the microspheres are hollow, they are sometimes referred to as microballoons.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, Extendospheres-SG made by the PQ Corporation. The chemistry of the preferred ceramic microspheres of the invention is predominantly silica ($SiO_2$) in the range of about 50 to 75% and alumina ($Al_2O_3$) in the range of about 15% to 40%, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa). Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC flooring, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance. The polymer microspheres preferably also are hollow spheres with a shell made of polymeric materials such as polyacrylonitrile, polymethacrylonitrile, polyvinyl chloride or polyvinylidine choride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/mL and have diameters in the range 10 to 350 microns (micrometers). It has been discovered that presence of polymer microspheres facilitates simultaneous attainment of the dual objectives of low panel density and enhanced cuttability and nailability. Although all of the panels of the invention can be cut using conventional carpentry tools, including polymer microspheres reduces resistance to nailing. This is a valuable property when nails are driven by hand. When pneumatic nailing equipment is used, the resistance of the panel to nailing is of less importance, so that the strength of the panel can be higher than for panels which are to be nailed by hand. Furthermore, it has been discovered that when a blend of ceramic and polymer microspheres is used in certain proportions, synergetic effects are realized in terms of improved rheological properties of the slurry and an increase in the dry bending strength of the panel.

In the first embodiment of the invention, only ceramic microspheres are used throughout the full thickness of the panel. The panel contains preferably about 35 to 42 wt. % of ceramic microspheres uniformly distributed throughout the thickness of the panel.

In the second embodiment of the invention, a blend of lightweight ceramic and polymer microspheres is used throughout the full thickness of the panel. In order to achieve the desired properties, the volume fraction of the polymer microspheres in the panel of the second embodiment of the invention will preferably be in the range of 7 to 15% of the total volume of the dry ingredients, where the dry ingredients of the composition are the reactive powders (i.e., hydraulic cement, calcium sulfate alpha hemihydrate, pozzolan, and lime), ceramic microspheres, polymer microspheres, and alkali-resistant glass fibers. The amount of polymer microspheres may be varied by adjusting the ratio of water-to-reactive powder, as desired to achieve a similar effect.

In the third embodiment of the invention, a multi-layer structure is created where at least one outer layer has improved nailability by reducing the resistance to nailing in the surface layer(s). This is achieved by using a high water-to-reactive powder ratio, by incorporating lightweight polymeric microspheres in substantial quantities in the surface layer(s), or a combination thereof. The core of the panel may contain only ceramic microspheres as lightweight filler uniformly distributed throughout the full thickness of the core layer or alternatively, a blend of ceramic and polymer microspheres may be used, or the water-to-reactive powder ratio may be adjusted, as in the second embodiment of the invention. The volume fraction of hollow polymer microspheres in the outer layers of the panel will preferably be in the range of 7 to 15% of the total volume of dry ingredients employed to make the panel, where the dry ingredients are the reactive powders (as defined above), ceramic microspheres, polymer microspheres, and alkali-resistant glass fibers. The preferable thickness of the outer layer(s) ranges between 1/32 to 4/32 inches (0.75 to 3.2 mm). Where only one outer layer is used, it preferably will be less than 3/8 of the total panel thickness.

Formulation

The components used to make the shear resistant panels of the invention are hydraulic cement, calcium sulfate alpha hemihydrate, an active pozzolan such as silica fume, lime, ceramic microspheres, polymer microspheres, alkali-resistant glass fibers, superplasticizer (e.g., sodium salt of polynapthalene sulfonate), and water. Small amounts of accelerators and/or retarders may be added to the composition in order to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention will include a continuous phase in which alkali-resistant glass fibers and microspheres are uniformly distributed. The continuous phase results from the curing of an aqueous mixture of the reactive powders (i.e., calcium sulfate alpha hemihydrate, hydraulic cement, an active pozzolan such as silica fume and lime), preferably including superplasticizer and/or other additives.

The broad and preferred weight proportions of these reactive powders in all three embodiments of the invention will be as follows:

| Reactive Powder | Weight Proportion (%) | |
| --- | --- | --- |
| | Broad | Preferred |
| Hydraulic Cement | 20–55 | 25–40 |
| Calcium Sulfate Alpha Hemihydrate | 35–75 | 45–65 |
| Pozzolan | 5–25 | 10–15 |
| Lime | up to 3.50 | 0.75–1.25 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In the first embodiment of the invention, the dry ingredients of the composition will be the reactive powders (hydraulic cement, calcium sulfate alpha hemihydrate, pozzolan, and lime), ceramic microspheres and alkali-resistant glass fibers, and the wet ingredients of the composition will be water and superplasticizer. The dry ingredients and the wet ingredients are combined to produce the panel of the invention. The ceramic microspheres are uniformly distributed in the matrix throughout the full thickness of the panel. Of the total weight of dry ingredients, the panel of the invention is formed from about 49 to 56 wt. % reactive powders, 35 to 42 wt. % ceramic microspheres and 7 to 12 wt. % alkali-resistant glass fibers. In the broad range, the panel of the invention is formed from 35 to 58 wt. % reactive powders, 34 to 49 wt. % ceramic microspheres, and 6 to 17 wt. % alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range between 35 to 60% of the weight of reactive powders and those for superplasticizer range between 1 to 8% of the weight of reactive powders. The glass fibers are monofilaments having a diameter of about 5 to microns (micrometers), preferably about 10 to 15 microns (micrometers). The monofilaments typically are combined in 100 filament strands, which may be bundled into rovings of about 50 strands. The length of the glass fibers will preferably be about 1 to 2 inches (25 to 50 mm) and broadly about 0.25 to 3 inches (6.3 to 76 mm). The fibers have random orientation, providing isotropic mechanical behavior in the plane of the panel.

The second embodiment of the invention contains a blend of ceramic and polymer microspheres uniformly distributed throughout the full thickness of the panel. It has been discovered that incorporation of polymer microspheres in the panel helps to achieve the combination of low density and ductility required to enable the panel to be cut or fastened (either nailed or screwed) with conventional carpentry tools. In addition, it has been found that the rheological properties of the slurry are improved substantially when a combination of hollow ceramic and polymer microspheres is utilized as part of the composition. Accordingly, in the second embodiment of the invention, the dry ingredients of the composition will be the reactive powders (hydraulic cement, calcium sulfate alpha hemihydrate, pozzolan, and lime), ceramic microspheres, polymer microspheres, and alkali-resistant glass fibers, and the wet ingredients of the composition will be water and superplasticizer. The dry ingredients and the wet ingredients will be combined to produce the panel of the invention. To achieve good fastening and cutting ability, the volume fraction of the polymer microspheres in the panel will preferably be in the range of 7 to 15% of the total volume of dry ingredients. Of the total weight of dry ingredients, the panel of the invention is formed from about 54 to 65 wt. % reactive powders, 25 to 35 wt. % ceramic microspheres, 0.5 to 0.8 wt. % polymer microspheres, and 6 to 10 wt. % alkali-resistant glass fibers. In the broad range, the panel of the invention is formed from 42 to 68 wt. % reactive powders, 23 to 43 wt. % ceramic microspheres, 0.2 to 1.0 wt. % polymer microspheres, and 5 to 15 wt. % alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70%, preferably 65% to 75%, when it is desired to use the ratio of water-to-reactive powder to reduce panel density and improve nailability. Since the water-to-reactive powder ratio can be adjusted to provide a similar effect to that of polymer microspheres, either may be used, or a combination of the two methods. The amount of superplasticizer will range between 1 to 8% of the weight of reactive powders. The glass fibers are monofilaments having a diameter of about 5 to 25 microns (micrometers), preferably about 10 to 15 microns (micrometers). They typically are bundled into strands and rovings as discussed above. The length of the glass fibers preferably is about 1 to 2 inches (25 to 50 mm) and broadly about 0.25 to 3 inches (6.3 to 76 mm). The fibers will have random orientation providing isotropic mechanical behavior in the plane of the panel.

In the second embodiment of the invention, incorporation of polymer microspheres in quantities as described above as a partial substitution for the ceramic microspheres helps to improve the composite dry flexural strength (see Example 9). In addition, partial substitution of ceramic microspheres by polymer microspheres reduces the water-to-reactive powders ratio needed to achieve a given slurry fluidity (see Example 13). A slurry containing a blend of ceramic and polymer microspheres will have superior flow behavior (workability) in comparison to the one containing ceramic microspheres only. This is of particular importance when the industrial processing of the panels of the invention requires the use of slurries with superior flow behavior.

In the third embodiment of the invention, a multi-layer structure in the panel is created where the outer layer(s) have improved nailability (fastening ability). This is achieved by incorporating polymer microspheres in substantial quantities in the outer layers, by increasing the water-to-cement ratio in the outer layer(s), or a combination thereof. The core of the panel will contain ceramic microspheres uniformly distributed throughout the layer thickness or alternatively, a blend of ceramic and polymer microspheres. The dry ingredients of the core layer will be the reactive powders (hydraulic cement, calcium sulfate alpha hemihydrate, pozzolan, and lime), microspheres (ceramic alone or a blend of ceramic and plastic microspheres), and alkali-resistant glass fibers, and the wet ingredients of the core layer are water and superplasticizer. The dry ingredients and the wet ingredients will be combined to produce the core layer of the panel of the invention. Of the total weight of dry ingredients, the core of the panel of the invention preferably is formed from about 49 to 56 wt. % reactive powders, 35 to 42 wt. % hollow ceramic microspheres and 7 to 12 wt. % alkali-resistant glass fibers, or alternatively, about 54 to 65 wt. % reactive powders, 25 to 35 wt. % ceramic microspheres, 0.5 to 0.8 wt. % polymer microspheres and 6 to 10 wt. % alkali-resistant glass fibers. In the broad range, the core layer of the panel of the invention is formed by about 35 to 58 wt. % reactive powders, 34 to 49 wt. % ceramic microspheres, and 6 to 17 wt. % alkali-resistant glass fibers, based on the total dry ingredients, or alternatively, about 42 to 68 wt. % of reactive powders, 23 to 43 wt. % ceramic microspheres, up to 1.0 wt. % polymer microspheres, preferably 0.2 to 1.0 wt. %, and 5 to 15 wt. % alkali-resistant glass fibers. The amounts of water and superplasticizer added to the dry ingredients will be adjusted to provide the desired slurry fluidity needed to satisfy the processing considerations for any particular manufacturing process. The typical addition rates for water will range between 35 to 70% of the weight of reactive powders but will be greater than 60% up to 70% when it is desired to use the ratio of water-to-reactive powders to reduce panel density and improve nailability and those for superplasticizer will range between 1 to 8% of the weight of reactive powders. When the ratio of water-to-reactive powder is adjusted to obtain a similar effect obtained with polymer microspheres, the slurry composition will be adjusted to provide the panel of the invention with the desired properties.

The dry ingredients of the outer layer(s) will be the reactive powders (hydraulic cement, calcium sulfate alpha hemihydrate, pozzolan, and lime), ceramic microspheres, polymer microspheres and alkali-resistant glass fibers, and the wet ingredients of the outer layer(s) will be water and superplasticizer. The dry ingredients and the wet ingredients are combined to produce the outer layers of the panel of the invention. In the outer layer(s) of the panel, the hollow polymer microspheres are incorporated in substantial quantities to furnish good fastening and cutting ability to the panel. The volume fraction of the polymer microspheres in the outer layers of the panel preferably is in the range of 7 to 15% of the total volume of dry ingredients. Of the total weight of dry ingredients, the outer layer(s) of the panel of the invention preferably are formed from about 54 to 65 wt. % reactive powders, 25 to 35 wt. % ceramic microspheres, 0.5 to 0.8 wt. % polymer microspheres, and 6 to 10 wt. % alkali-resistant glass fibers. In the broad range, the outer layers of the panel of the invention are formed from about 42 to 68 wt. % reactive powders, 23 to 43 wt. % ceramic microspheres, up to 1.0 wt. % polymer microspheres, and 5 to 15 wt. % alkali-resistant glass fibers, based on the total dry ingredients. The amounts of water and superplasticizer added to the dry ingredients are adjusted to provide the desired slurry fluidity needed to satisfy the processing considerations for any particular manufacturing process. The typical addition rates for water range between 35 to 70% of the weight of reactive powders and particularly greater than 60% up to 70% when the ratio of water-to-reactive powders is adjusted to reduce panel density and improve nailability and those for superplasticizer will range between 1 to 8% of the weight of reactive powders. The preferable thickness of the outer layer(s) ranges between 1/32 to 4/32 inches (0.8 to 3.2 mm) and the thickness of the outer layer when only one is used will be less than 3/8 of the total thickness of the panel.

In both the core and outer layer(s), the glass fibers are monofilaments having a diameter of about 5 to 25 microns (micrometers), preferably 10 to 15 microns (micrometers). The monofilaments typically are bundled into strands and rovings as discussed above. The length preferably is about 1 to 2 inches (25 to 50 mm) and broadly about 0.25 to 0 3 inches (6.3 to 76 mm). The fiber orientation will be random, providing isotropic mechanical behavior in the plane of the panel.

Making a Panel of the Invention

The hydraulic cement, calcium sulfate alpha hemihydrate and microspheres are blended in the dry state in a suitable mixer. Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form a smooth homogeneous slurry.

The slurry may be combined with the glass fibers in several ways, with the objective of obtaining a uniform mixture. The glass fibers typically will be in the form of rovings that are chopped into short lengths. In a preferred embodiment, the slurry and the chopped glass fibers are concurrently sprayed into a panel mold. Preferably, spraying is done in a number of passes to produce thin layers, preferably up to about 0.25 inches (6.3 mm) thick, which are built up into a uniform panel having no particular pattern and with a thickness of ¼ to 1 inch (6.3 to 25.4 mm). For example, in one application, a 3×5 ft (0.91×1.52 m) panel was made with six passes of the spray in the length and width directions. As each layer is deposited, a roller may be used to assure that the slurry and the glass fibers achieve intimate contact. The layers may be leveled with a screen bar or other suitable means after the rolling step.

Typically, compressed air will be used to atomize the slurry. As it emerges from the spray nozzle, the slurry mixes with glass fibers that have been cut from a roving by a chopper mechanism mounted on the spray gun. The uniform mixture of slurry and glass fibers is deposited in the panel mold as described above.

In the third embodiment of the invention, the outer surface layers of the panel contain polymer spheres in substantial quantities in order that the fasteners used to attach the panel to framing can be driven easily. The preferable thickness of such layers will be about 1/32 inches to 4/32 inches (0.8 to 3.2 mm). The same procedure described above by which the core of the panel is made may be used to apply the outer layers of the panel.

Other methods of depositing a mixture of the slurry and glass fibers will occur to those familiar with the panel-making art. For example, rather than using a batch process to make each panel, a continuous sheet may be prepared in a similar manner, which after the material has sufficiently set, can be cut into panels of the desired size.

Figure 3:
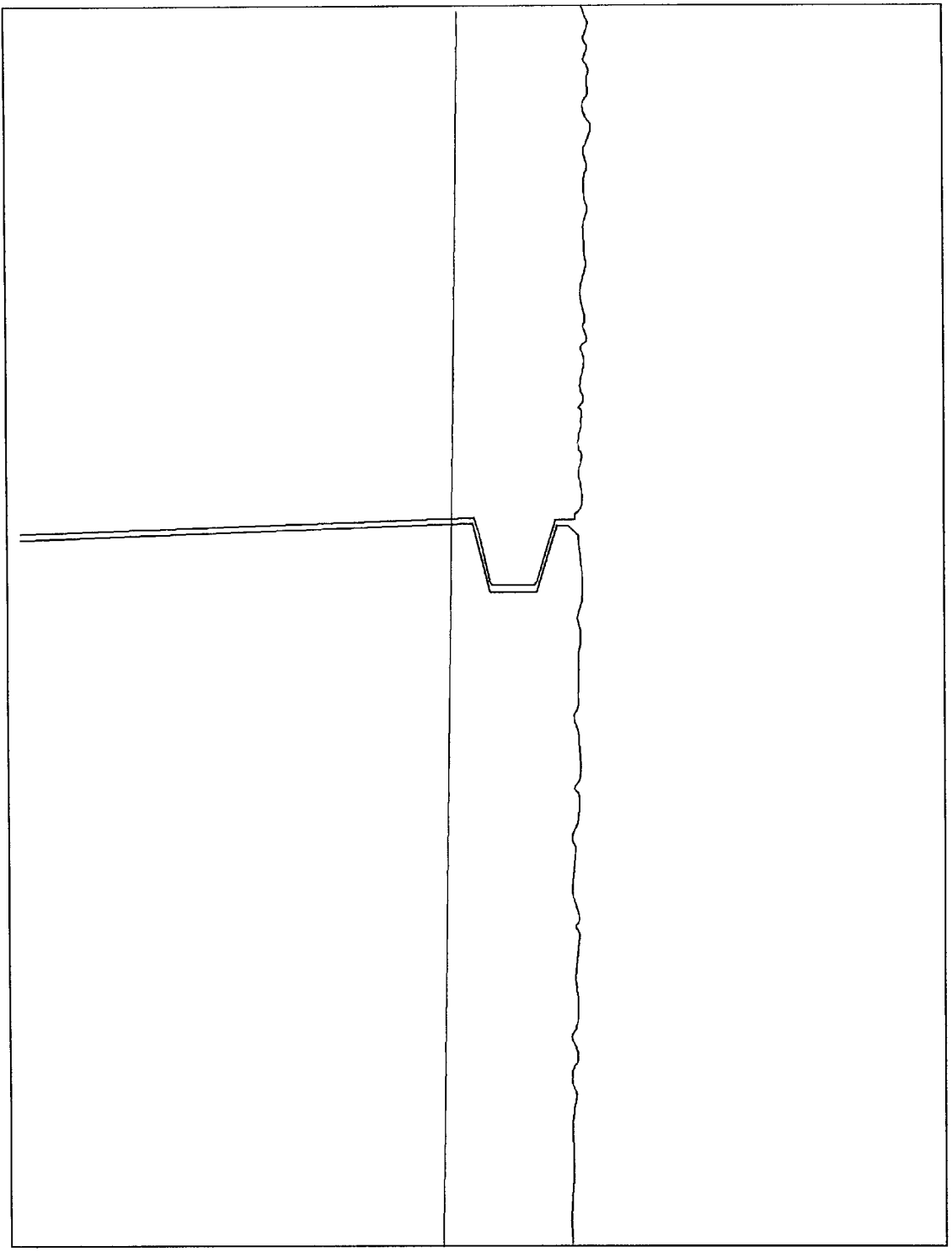
FIG. 3 shows a tongue-and-groove panel.
Figure 4A:
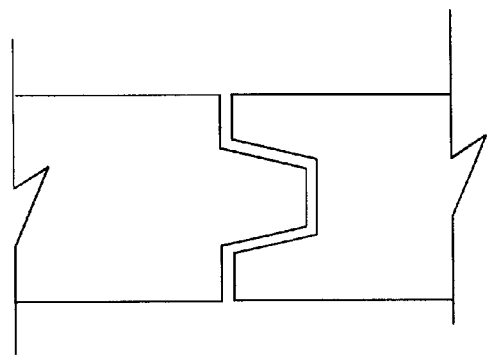
FIGS. 4a, 4b, and 4c illustrate the dimensions of the tongue and groove of a ¾ inch (19.1 mm) thick panel.
Figure 4B:
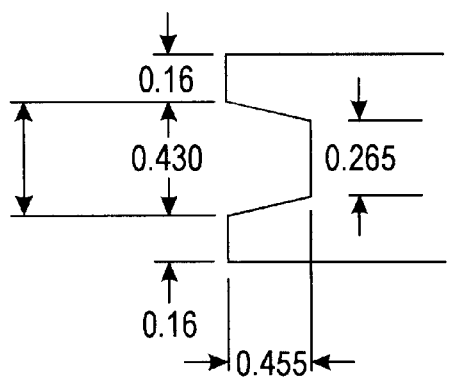
Figure 4C:
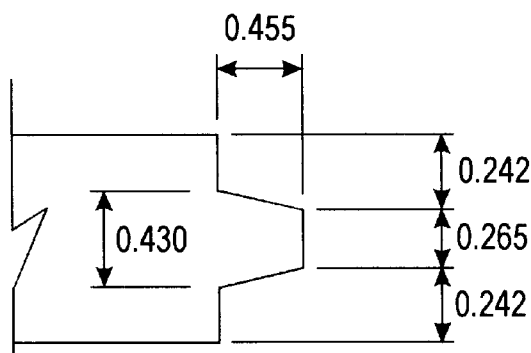

In many applications, for example in siding, the panels will be nailed or screwed to vertical framing. In some applications, such as where the panels are used as structural subflooring or flooring underlayment, they preferably will be made with a tongue and groove construction, which may be made by shaping the edges of the panel during casting or before use by cutting the tongue and groove with a router. Preferably, the tongue and groove will be tapered, as shown in FIGS. 3 and 4, the taper providing easy installation of the panels of the invention.

EXAMPLE 1

A panel was cast using the mixture composition shown in Table A in a spray-up process. The measured slurry density was 69.8 lbs/ft$^3$ (1118 kg/m$^3$). Fiber weight proportion of 7.1% shown in the table corresponded to a fiber volume of 3% in the panel. The cast panel was covered with a plastic sheet and was allowed to cure for one week.

After one week, the panel was removed from the mold and cut into specimens of size 4×12 inches (101.6×304.8 mm) for the evaluation of flexural strength, 6×6 inches (152.4×152.4 mm) for the evaluation of nail pull strength, and 4×10 inches (101.6×254 mm) for evaluation of lateral fastener resistance. The specimens were divided into two sets. The specimens from the first set were placed in plastic bags and cured for 28 days under moist conditions, and were further dried for 4 days in an oven at 131° F. (55° C.) before testing. The oven dried specimens were found to have a density of 63.3 lbs/ft$^3$ (1013 kg/m$^3$). The flexural strength measured according to ASTM C 947 was found to be 2927 lbs/in$^2$ (20.2 MPa). The lateral fastener resistance for a 1⅝ inches (41.28 mm) long screw when measured according to a modified version of ASTM D 1761 as described by R. Tuomi and W. McCutcheon, ASCE Structural Division Journal, July 1978 was found to be 542.4 lbs (246.5 kg). The nail pull strength measured according to ASTM C 473 was found to be 729.6 lbs (331.6 kg).

The specimens from the second set were placed in plastic bags and cured for 28 days under moist conditions, then were dried for 4 days in an oven at 131° F. (55° C.), and finally were further soaked in water for 48 hours before testing. The soaked specimens were found to have a density of 72.6 lbs/ft$^3$ (1162 kg/m$^3$), flexural strength equal to 2534 lbs/in$^2$ (178.5 kg/cm$^2$), lateral fastener resistance equal to 453.2 lbs (206 kg), and nail pull strength equal to 779.5 lbs (354 kg).

TABLE A

| Ingredient | Weight Proportion (%) |
| --- | --- |
| Calcium Sulfate Alpha Hemihydrate[1] | 23.7 |
| Type III Portland Cement[2] | 11.9 |
| Silica Fume[3] | 4.9 |
| Hydrated Lime | 0.4 |
| Ceramic Microspheres[4] (Extendospheres-SG) | 27.4 |
| Superplasticizer[5] | 1.8 |
| Water | 22.8 |
| Alkali-resistant Glass Fibers[6] | 7.1 |

[1]USG Company
[2]Blue Circle Cement
[3]Elken Materials, Inc.
[4]PQ Corporation
[5]Geo Specialty Chemicals
[6]Glass Nippon Electric Company

EXAMPLE 2

A panel made according to ASTM D 1037 was tested for the effect of immersion in water (after oven drying at 55° C.) and compared to the performance of the competitive oriented strand board and plywood panels. Specimens 4×10 inches (101.6×254 mm) were immersed in water for 24 hours, after which the water absorption and swelling of each panel was measured. The results are given in Table B.

TABLE B

| Panel Type | Water Absorption (%) | | Swelling (%) | |
| --- | --- | --- | --- | --- |
| | 0.5" (12.7 mm) | 0.75" (19.1 mm) | 0.5" (12.7 mm) | 0.75" (19.1 mm) |
| Invention | 11.8 | 10.8 | 2.3 | 2.4 |
| OSB | 51.5 | 51.3 | 22.3 | 22.2 |
| Plywood | 46.2 | 48.1 | 9.1 | 7.8 |

It can be seen that the panel of the invention absorbed much less water and expanded much less than either the OSB or plywood panels. Thus, the panels of the invention should not require protection against moisture, as do the wood-based panels.

EXAMPLE 3

Failure of a panel under shear loading may occur at the fastener, i.e., a nail or screw. The resistance to failure can be measured by the modified version of ASTM D1761 described in Example 1. The test applies a load to a framing member attached to a sheathing panel sample. The load to failure is measured. Such a test was carried out to compare the panels of the invention with oriented strand board and plywood. The results are given in Table C.

TABLE C

| Panel Type[1] | Panel | | | Ultimate Load, lbs (kg) | |
| --- | --- | --- | --- | --- | --- |
| | Thickness | | Fastener | Dry | Wet[2] |
| Invention | 0.5" (12.7 mm) | | 6 d common steel wire nail[4] | 238 (108.2) | 270 (122.7) |
| OSB | 0.5" (12.7 mm) | | | 167 (75.9) | 190 (86.4) |
| Plywood | 0.5" (12.7 mm) | | | 158 (71.8) | 183 (91.5) |
| Invention | 0.75" (19.1 mm) | | 8 d common steel wire nail[4] | 308 (140) | 291 (132.3) |
| OSB | 0.75" (19.1 mm) | | | 232 (105.5) | 235 (106.8) |
| Plywood | 0.75" (19.1 mm) | | | 248 (112.7) | 210 (95.5) |
| Invention | 0.5" (12.7 mm) | | 1 ⅝" (41.3 mm) Hi-Lo screw[3] | 445 (202.3) | 558 (253.6) |
| OSB | 0.5" (12.7 mm) | | | 443 (201.4) | 443 (201.4) |
| Plywood | 0.5" (12.7 mm) | | | 425 (193.2) | 511 (232.3) |
| Invention | 0.75 (19.1 mm) | | 1 ⅝" (41.3 mm) Hi-Lo screw[3] | 414 (188.2) | 481 (218.6) |
| OSB | 0.75 (19.1 mm) | | | 343 (155.9) | 353 (160.5) |
| Plywood | 0.75 (19.1 mm) | | | 404 (183.6) | 395 (179.6) |

[1]Size 4 × 10 inches (101.6 × 254 mm)
[2]24 hour immersion in water
[3]USG Company
[4]nail size as defined in ASTM F 1667-97 (NLCMS type nail)

The results of the above tests show that the panels of the invention will withstand a greater load before failure than the oriented stand board (OSB) and plywood tested, particularly when nails were used as fasteners.

EXAMPLE 4

Another test applied to panels measures the force required to withdraw fasteners from sample panels. These tests were carried out according to ASTM D1761-88 and APA Test Method S-4. The results are given in Table D.

TABLE D

| Panel Type[1] | Panel | | Ultimate Load, lbs (kg) | |
| --- | --- | --- | --- | --- |
| | Thickness | Fastener | Dry | Wet[2] |
| Invention | 0.5" (12.7 mm) | 6 d common steel wire[4] | 28 (12.7) | 32 (14.6) |
| OSB | 0.5" (12.7 mm) | | 25 (11.4) | 32 (14.6) |
| Plywood | 0.5" (12.7 mm) | | 27 (12.3) | 26 (11.8) |
| Invention | 0.75" (19.1 mm) | 8 d common steel wire nail[4] | 60 (27.3) | 75 (34.1) |
| OSB | 0.75" (19.1 mm) | | 73 (33.1) | 68 (30.9) |
| Plywood | 0.75" (19.1 mm) | | 58 (26.4) | 88 (40) |
| Invention | 0.5" (12.7 mm) | 1 ⅝" (41.3 mm) Hi-Lo screw[3] | 352 (160) | 293 (133.2) |
| OSB | 0.5" (12.7 mm) | | 216 (98.2) | 148 (67.3) |
| Plywood | 0.5" (12.7 mm) | | 279 (126.8) | 184 (83.6) |
| Invention | 0.75 (19.1 mm) | 1 ⅝" (41.3 mm) Hi-Lo screw[3] | 522 (237.3) | 478 (217.3) |
| OSB | 0.75 (19.1 mm) | | 372 (169.1) | 391 (177.7) |
| Plywood | 0.75 (19.1 mm) | | 525 (238.6) | 383 (174.1) |

[1]Specimen 3 × 6 inches (76.2 × 152.4 mm)
[2]24 hour immersion in water
[3]USG Company
[4]nail size as defined in ASTM F 1667-97 (NLCMS type nail)

The results indicate that panels of the invention provide superior or at least equivalent performance relative to oriented strand board or plywood.

EXAMPLE 5

One potential application for panels of the invention is as structural flooring panels. The performance of flooring panels can be measured by ASTM E661 and APA Test Method S-1. Panels 0.75 inches (19.1 mm) thick and 2×4 feet (610×1219 mm) in size are supported on 2×10 inch joists (50.8×254 mm) spaced on 16 inch (406.4 mm) centers. A load is applied midway between the joists and the ultimate load to failure and the defection are measured. A test of three panels of the invention was carried out. The results are given in Table E.

TABLE E

| Ultimate Load lbs (kg) | | Deflection Under 200 lbs load inches (mm) | |
|---|---|---|---|
| Static | After Impact[1] | Static | After Impact[1] |
| 1286 (584.6) | 2206 (1002.7) | 0.014 (0.36) | 0.038 (0.97) |

[1]Static load test after 75 ft-lb impact (0.102kJ)

The criteria for APA rated Sturd-I-Floor Panels are an ultimate static load of 550 lbs (250 kg) and 400 lbs (181.8 kg) after impact. The deflection permitted is 0.078 inches (1.98 mm) under both static load and after impact. The panels of the invention are shown to be clearly superior performers. Thus, they may be used as structural flooring panels, rather than as only underlayment, although the panels of the invention may be used for that purpose also.

EXAMPLE 6

This example illustrates the influence of accelerated aging on flexural strength (long-term strength) of the panels made utilizing the compositions of the invention. The accelerated aging results obtained for the panels of invention are compared with the accelerated aging performance of the panels made utilizing the compositions containing the reactive powder blends of the prior art. The reactive powder blends of the prior art have not contained calcium sulfate alpha hemihydrate in the composition. In Table F.1, Mix A and Mix B are the compositions of the invention, while Mix C and Mix D are the compositions containing the reactive powder blends of prior art. The reactive powder blends of the above four mixes are as follows:

Mix A: calcium sulfate alpha hemihydrate, Type III Portland cement, silica fume, and lime;

Mix B: calcium sulfate alpha hemihydrate, Type III Portland cement, metakaolin, and lime;

Mix C: Type III Portland cement, water-quenched blast furnace slag and NSR (prior art reactive powder blend); and Mix D: Type III Portland cement and silica fume (prior art reactive powder blend).

In the Mixes A and B, potassium tartrate was added at a rate of 0.07% of the total weight of reactive powders (calcium sulfate alpha hemihydrate, Portland cement Type III, silica fume and lime) to retard the setting of the slurry.

In Mix C, an oxycarboxylic acid based set-controlling agent (from Denki Kagaku Kogya Co., Ltd.) was added at a rate of 0.80% of the total weight of the reactive powders (i.e., Type III Portland cement, slag and NSR). NSR is a superior contractile admixture consisting of calcium aluminate and inorganic sulfate that assists in reducing the overall curing time.

For the four mixture compositions shown in Table F.1, 3×5 ft (0.91×1.52 m) panels were cast utilizing the spray-up process described earlier. All panels contained 1.57 inches (40 mm) long alkali-resistant glass fibers randomly distributed in the X-Y plane. The cast panels were covered with a plastic sheet and were allowed to cure for one week. After one week, the panels were removed from the mold and were cut into specimens of size 4×12 inches (101.6×304.8 mm) for the determination of flexural strengths. The specimens from each panel were divided into at least six sets. The specimens were cured in a moist plastic bag for 28 days, and were further dried in an oven at 131° F. (55° C.) for four days. The specimens from the first set were tested in flexure (ASTM C 947) after taking them out from the oven. The corresponding results are reported in Table F.2. The performance of the dried panels was similar. The specimens from the remaining five sets were reserved for the determination of flexural strength at the accelerated ages of 7, 14, 21, 56 and 112 days, respectively. To accelerate the aging process, 4×12 inches (101.6×304.8 mm) specimens were immersed in 60° C. (140° F.) water for a maximum duration of 112 days. The specimens were removed at different time intervals and were tested for modulus of rupture and maximum deflection in a flexure test (ASTM C 947). The maximum deflection in a flexure test is defined as the specimen load point displacement corresponding to the peak load. For specimens belonging to Mix D, the 112-day accelerated aging test was not performed.

Figure 1B:
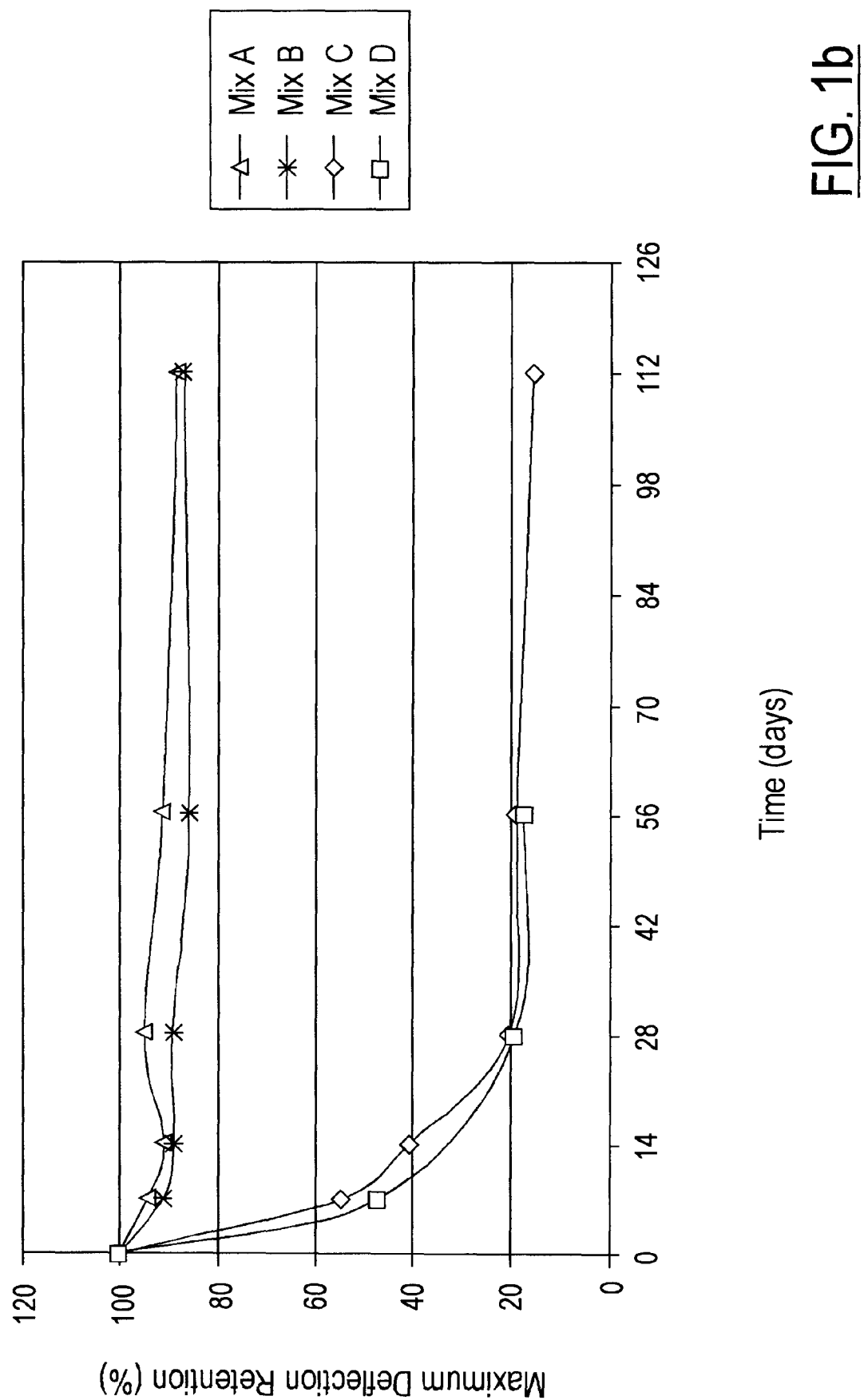

Results for modulus of rupture (flexural strength) retention are shown in FIG. 1A. It can be seen that the performance of the panels containing the reactive powder blends of the invention (Mixes A and B) was substantially superior compared to panels made using the reactive powder blends of prior art. The panels of the invention retained greater than 80% of their initial strength at the end of the accelerated aging period of 112 days. On the other hand, the panel with the prior art Nippon reactive powder blend (Mix C) lost almost 50% of its initial strength in less than 28 days of accelerated aging. Similarly, the panel with the prior art Portland cement and silica fume blend (Mix D) lost almost 60% of its initial strength in less than 28 days of accelerated aging. The maximum deflection retention results are shown in FIG. 1B. Again, it can be noticed that the performance of the panels containing the reactive powder blends of the invention (Mixes A and B) was substantially superior to the panels made utilizing the reactive powder blends of the prior art. The panels of invention retained greater than 80% of their initial deflection at the end of the accelerated aging period of 112 days. On the other hand, the panels made utilizing the reactive blends of the prior art (Mixes C and D) became extremely brittle and retained only about 20% of their initial deflection at the end of 28 days of accelerated aging. From these results, it was concluded that the panels of the invention maintain their strength and ductility with aging in contrast to the panels made using the reactive powder blends of the prior art.

TABLE F.1

| | Weight Proportion (%) | | | |
|---|---|---|---|---|
| Ingredient | Mix A | Mix B | Mix C | Mix D |
| Calcium Sulfate Alpha Hemihydrate[1] | 24.1 | 23.7 | — | — |
| Portland Cement Type III[2] | 12.1 | 11.8 | 16.5 | 31.0 |
| Silica Fume[3] | 5.0 | — | — | 3.5 |
| Metakaolin[4] | — | 4.9 | — | — |
| Hydrated Lime | 0.4 | 0.4 | — | — |
| NRS (Nippon)[5] | — | — | 8.2 | — |

TABLE F.1-continued

| Ingredient | Weight Proportion (%) | | | |
|---|---|---|---|---|
| | Mix A | Mix B | Mix C | Mix D |
| Blast Furnace Slag (Nippon)[6] | — | — | 16.5 | — |
| Ceramic Microspheres[7] (Extendospheres-SG) | 27.8 | 27.4 | 27.6 | 27.5 |
| Superplasticizer[8] | 1.8 | 1.8 | 1.8 | 1.5 |
| Water | 22.1 | 23.4 | 21.9 | 24.3 |
| Alkali-resistant Glass Fibers[9] | 6.7 | 6.6 | 7.5 | 12.2 |

[1]USG Company
[2]Blue Circle Cement
[3]Elkern Materials, Inc.
[4]Engelhard Corporation
[5]Denki Kagaku Kogyo Co., Ltd.
[6]Lone Star Industries
[7]PQ Corporation
[8]Geo Specialty Chemicals
[9]Nippon Electric Glass Co., Ltd.

TABLE F.2

| Panel Identification | Fiber Volume (%) | Modulus of Rupture (psi) | Maximum Deflection (inches) |
|---|---|---|---|
| Mix A | 2.86 | 3287 | 0.454 |
| Mix B | 2.63 | 2704 | 0.389 |
| Mix C | 3.10 | 2848 | 0.475 |
| Mix D | 5.40 | 3863 | 0.414 |

EXAMPLE 7

A panel of the invention was made according to Example 1 having dimensions of 32 by 48 inches (81.3 by 121.9 mm) and 0.5 inches thick (12.7 mm). The panel was tested according to a modified version of ASTM E 72 to determine the shear strength (or racking strength). Other panels having the same dimensions were tested using the same procedure, except that an oriented strand board (OSB), plywood, and the panel of the invention were nailed with 8d nails on 6 inch (152 mm) centers with 12 inch (304 mm) spacing on the intermediate studs, while a Durock® cement panel (US Gypsum Company) was nailed on 8 inch (203.2 mm) centers on both the perimeter and the intermediate studs. The plywood and Durock® panels were tested with the fiber orientation both parallel and perpendicular to the applied force. The panel of the invention contained 1.57 inch (40 mm) long discrete glass fibers at a nominal fiber volume of 3%. The panel was tested in dry condition at an age of 28-days. The other panels were also in dry condition when tested.

Figure 2:
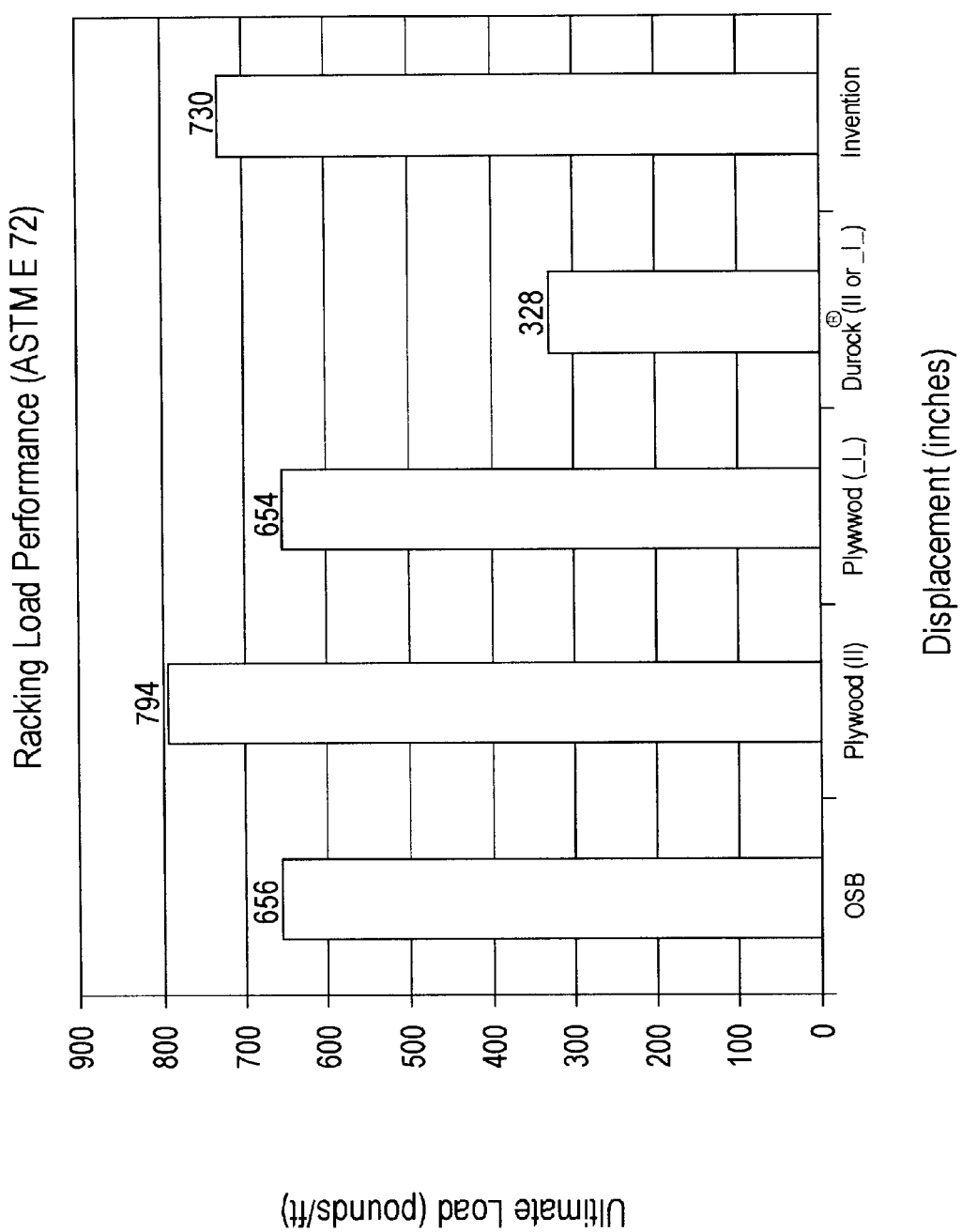
FIG. 2 is a bar graph of the results of the tests reported in Example 7.

The results of the racking (shear) test are shown in the bar chart of FIG. 2. The superior performance of the panel of the invention is evident, particularly as compared to the load carried by the Durock® cement panel.

EXAMPLE 8

Samples of the Inventive Panel, Durock® Exterior Cement Board, OSB and Plywood were tested for mold and mildew resistance according to ASTM G 21. The results in Table G clearly show that the Inventive Panel does not support any mold and mildew growth. On the other hand, the OSB and Plywood Panels have extremely poor resistance to the growth of mold and mildew.

TABLE G

| Panel Identification | Growth (28-Day Result) |
|---|---|
| Durock ® Exterior Cement Board | 0 |
| Inventive Panel | 0 |
| OSB Panel | 4 |
| Plywood Panel | 4 |

EXAMPLE 9

Six half-inch (12.7 mm) thick panels containing varying amounts of ceramic microspheres and polymer microspheres and providing constant density were cast according to the method and procedure described earlier. The mixture proportions for the six mixes are shown in Table H. All mixtures contained 0.07 wt. % potassium tartrate based on the total weight reactive powders (previously defined) to retard setting of the slurry. All panels contained 1.57 inches (40 mm) long glass fibers randomly distributed in the X-Y plane. The ceramic microspheres used were Extendospheres-SG manufactured by The PQ Corporation and the polymer microspheres were Dualite MS 7000 manufactured by Pierce & Stevens Corporation. Table H also shows that the water-to-reactive powder ratio decreases with increase in the content of polymer microspheres. The panels were wrapped with a plastic sheet and cured for 28 days. Thereafter, ten flexural specimens of size 4 inches by 12 inches were cut and dried in an oven maintained at a temperature of 131° F. (55° C.) for 4 days. Five flexural specimens were tested soon after oven drying (28-day Oven Dry) and the rest were tested after soaking in water for 48 hours (28-day Wet). The flexural testing was conducted according to ASTM C 947. The results for the various mixes are compared in Table G. From the results it is evident that the oven dry flexural strength increases with increase in the content of the polymer microspheres in the mix. The observed increase is primarily attributed to an enhanced interaction between the fibers and the continuous phase. Thus, this example shows that at a preferred range of polymer microspheres, the dry bending strength of the composite is increased.

TABLE H

| Ingredient[1] | Weight Proportion (%) | | | | | |
|---|---|---|---|---|---|---|
| | Mix 1 | Mix 2 | Mix 3 | Mix 4 | Mix 5 | Mix 6 |
| Calcium Sulfate Alpha Hemihydrate | 24.0 | 24.8 | 25.5 | 26.3 | 26.8 | 28.4 |
| Portland Cement Type III | 12.0 | 12.4 | 12.8 | 13.2 | 13.4 | 14.2 |
| Silica Fume | 5.0 | 5.1 | 5.3 | 5.4 | 5.6 | 5.9 |
| Hydrated Lime | 0.4 | 0.4 | 0.4 | 0.5 | 0.5 | 0.5 |
| Ceramic Microspheres (Extendospheres-SG) | 27.7 | 26.1 | 24.4 | 22.8 | 21.7 | 19.1 |
| Polymer Microspheres (Dualite MS 7000)[2] | 0.0 | 0.1 | 0.3 | 0.5 | 0.6 | 0.7 |
| Superplasticizer | 1.8 | 1.9 | 1.9 | 2.0 | 2.0 | 1.5 |
| Water | 22.0 | 22.1 | 22.2 | 22.4 | 22.3 | 22.5 |
| Alkali-resistant Glass Fibers | 7.1 | 7.1 | 7.2 | 7.2 | 7.1 | 7.2 |

[1]Source given in Table F.1
[2]Pierce & Stevens Corporation

TABLE I

| Mix # | Density (pcf) 28-Day Oven Dry | Flexural Strength (psi) 28-Day Oven Dry | 28-Day Wet |
|---|---|---|---|
| Mix 1 | 65.3 | 3159 | 2824 |
| Mix 2 | 63.6 | 3150 | 2890 |
| Mix 3 | 64.6 | 3383 | 2690 |
| Mix 4 | 65.8 | 3528 | 2791 |
| Mix 5 | 65.3 | 3700 | 2846 |
| Mix 6 | 65.6 | 3627 | 2827 |

EXAMPLE 10

A panel was cast utilizing the mixture composition shown in Table J in a spray-up process. Potassium tartrate was added at the rate of 0.07 wt. % of the reactive powders to retard setting of the slurry. The measured slurry density was 69.8 lbs/ft$^3$ (1118 kg/m$^3$). The panel contained 1.57 inches (40 mm) long glass fibers randomly distributed in the X-Y plane. The cast panel was covered with a plastic sheet and was allowed to cure for one week.

After one week, the panel was removed from the mold and was cut into specimens of size 4×12 inches (101.6×304.8 mm) for flexural strength, 6×6 inches (152.4×152.4 mm) for the evaluation of nail pull strength, and 4×10 inches (101.6×254 mm) for the evaluation of lateral fastener resistance. The specimens were divided into two sets. The specimens from the first set were placed in plastic bags and cured until the age of 28 days under moist conditions, and were further dried for 4 days in an oven at 131° F. (55° C.) before testing. The oven dried specimens were found to have a density of 63.3 lbs/ft$^3$ (1013 kg/m$^3$). The flexural strength measured according to ASTM C 947 was found to be 2927 lbs/in$^2$ (206 kg/cm$^2$). The lateral fastener resistance for a 1⅝ inches (41.28 mm) long screw when measured according to a modified version of ASTM D 1761 as described by R. Tuomi and W. McCutcheon, ASCE Structural Division Journal, July 1978 was found to be 542.4 lbs (246.5 kg). The nail pull strength measured according to ASTM C 473 was found to be 729.6 lbs (331.6 kg).

The specimens from the second set were placed in plastic bags and cured for 28 days under moist conditions, then were dried for 4 days in an oven at 131° F. (55° C.), and finally were further soaked in water for 48 hours before testing. The soaked specimens were found to have a density of 72.6 lbs/ft$^3$ (1162 kg/m$^3$), flexural strength equal to 2534 lbs/in$^2$ (178.5 kg/cm$^2$), lateral fastener resistance equal to 453.2 lbs (206 kg), and nail pull strength equal to 779.5 lbs (354 kg).

TABLE J

| Ingredient[1] | Weight Proportion (%) |
|---|---|
| Calcium Sulfate Alpha Hemihydrate | 23.7 |
| Type III Portland Cement | 11.9 |
| Silica Fume | 4.9 |
| Hydrated Lime | 0.4 |
| Ceramic Microspheres (Extendospheres-SG) | 27.4 |
| Superplasticizer | 1.8 |
| Water | 23.4 |
| Alkali-resistant Glass Fibers | 7.1 |

[1]Source given in Table F.1

EXAMPLE 11

A panel was cast utilizing the mixture composition shown in Table K in a spray-up process. For comparison with Example 10, where the pozzolan was silica fume, the pozzolan used in the reactive powder blend to make the panel of this example was metakaolin. Potassium tartrate was added at a rate of 0.07% of the total weight of reactive powders to retard the setting of the slurry. The panel contained 1.57 inches (40 mm) long glass fibers randomly distributed in the X-Y plane. The measured slurry density was 67.5 lbs/ft$^3$ (1081 kg/m$^3$). The cast panel was covered with a plastic sheet and was allowed to cure for one week. After one week, the panel was removed from the mold and was cut into specimens of size 4×12 inches (101.6×304.8 mm) for the evaluation of flexural strength, 6×6 inches (152.4×152.4 mm) for the evaluation of nail pull strength, and 4×10 inches (101.6×254 mm) for the evaluation of lateral fastener resistance. The specimens were divided into two sets. The specimens from first set were placed in plastic bags and cured for 28 days under moist conditions, and then were further dried for 4 days in an oven at 131° F. (55° C.) before testing. The oven dried specimens were found to have a density of 63.7 lbs/ft$^3$ (1019 kg/m$^3$). The flexural strength measured according to ASTM C 947 was found to be 2747 lbs/in$^2$ (193.5 kg/cm$^2$). The lateral fastener resistance for a 1⅝ inches long screw when measured according to a modified version of ASTM D 1761 as described by R. Tuomi and W. McCutcheon, ASCE Structural Division Journal, July 1978 was found to be 569.2 lbs (258.7 kg). The nail pull strength measured according to ASTM C 473 was found to be 681.6 lbs (309.8 kg).

The specimens from the second set were placed in plastic bags and cured for 28 days under moist conditions, then were dried for 4 days in an oven at 131° F. (55° C.), and finally were further soaked in water for 48 hours before testing. The soaked specimens were found to have a density of 70 lbs/ft$^3$ (1162 kg/m$^3$) flexural strength equal to 2545.5 lbs/in$^2$ (179.3 kg/cm$^2$), lateral fastener resistance equal to 588 lbs (267.3 kg), and nail pull strength equal to 625 lbs (284 kg).

TABLE K

| Ingredient[1] | Weight Proportion (%) |
|---|---|
| Calcium Sulfate Alpha Hemihydrate | 23.7 |
| Type III Portland Cement | 11.9 |
| Metakaolin | 4.9 |
| Hydrated Lime | 0.4 |
| Ceramic Microspheres (Extendospheres-SG) | 27.4 |
| Superplasticizer | 1.8 |
| Water | 23.4 |
| Alkali-resistant Glass Fibers | 6.5 |

[1]Source given in Table F.1

EXAMPLE 12

For flooring applications, a desired feature is to have a tongue and groove shape created in the panel edges. The preferred tongue and groove shape is illustrated in FIG. 3. The tongue and groove provides panel edge support at the panel-to-panel joint for the edge that is perpendicular to the underlying framing. The tongue and groove limits differential movement between adjacent panel edges. As a result, the joint between the adjacent panels can be made without the use of blocking underneath that otherwise is required by the building codes. The tongue and groove are created by producing a groove in the edge of one panel, and a corresponding projection (tongue) in the adjacent panel, that fits into the groove of the first panel. The actual dimensions of the tongue and groove for a ¾ inches (19.1 mm) thick panel are illustrated in FIG. 4. A tongue and groove can also be produced for panels of ½ inches (12.7 mm) and ⅝ inches (15.9 mm) thickness. The tongue and groove can be produced in the panel during casting by shaping the panel when in the wet state, or the tongue and groove can be produced after the panel has been cast and hardened by cutting the tongue and groove with a router. The panels of the invention, due to their strength, ductibility and light weight, can employ a tongue and groove shape at their edges, which can then be nailed or screwed with conventional construction fasteners. Prior art fiber reinforced cement panels have been too heavy and brittle to employ a tongue and groove edge that can be fastened with conventional fasteners.

EXAMPLE 13

The following test results demonstrate the effect on nailability of adding polymer spheres to the panel or increasing the water-to-reactive powders ratio. The compositions shown in Table L were used to prepare 0.5 inch thick (12.7 mm) panels. Nailability was determined by driving fifty 8-penny nails (ASTM F 1667-97 NLCMS type nails) and recording the average number of hammer blows needed to drive each nail and the number of bent nails which could not be fully driven. It was found that the average number of hammer blows was reduced when a higher water-to-reactive powders ratio was used or polymer microspheres were added. The number of bent nails was markedly reduced, as will be seen in Table M below.

TABLE L

|  | reference | high w:c | 6% Dualite | 9% Dualite | 12% Dualite |
|---|---|---|---|---|---|
| polymer microspheres total vol % | 0 | 0 | 6 | 9 | 12 |
| w:c (water:reactive powders), wt. % | 0.561 | 0.65 | 0.522 | 0.505 | 0.489 |
| Type III Portland cement, wt. % | 12.01 | 11.55 | 13.03 | 13.61 | 14.14 |
| Silica fume (dry) ), wt. % | 4.97 | 4.78 | 5.39 | 5.63 | 5.85 |
| Ca(OH)2), wt. % | 0.41 | 0.4 | 0.45 | 0.47 | 0.49 |
| Calcium sulfate alpha hemihydrate), wt. % | 24.03 | 23.11 | 26.06 | 27.22 | 28.28 |
| superplasticizer (Diloflo) ), wt. % | 1.82 | 1.75 | 1.98 | 2.07 | 2.15 |
| potassium tartrate), wt. % | 0.03 | 0.03 | 0.03 | 0.03 | 0.03 |
| AR glass fibers), wt. % | 6.94 | 6.97 | 6.92 | 6.95 | 6.95 |
| SG ceramic spheres), wt. % | 27.76 | 26.69 | 23.64 | 21.17 | 18.99 |
| Dualite polymer spheres), wt. % | 0 | 0 | 0.36 | 0.54 | 0.71 |
| Mixing plain water), wt. % | 22.02 | 24.72 | 22.13 | 22.32 | 22.41 |
| Total | 99.99 | 100 | 99.99 | 100.01 | 100 |

TABLE M

|  | reference | high w:c | 6% Dualite | 9% Dualite | 12% Dualite |
|---|---|---|---|---|---|
| polymer microspheres total vol % | 0 | 0 | 6 | 9 | 12 |
| av. hammer blows per nail | 16 | 10 | 9 | 9 | 8 |
| bent nails | 29 | 5 | 11 | 4 | 3 |
| board damage | no | no | no | no | no |
| difficulty | high | moderate | high | moderate | moderate |

It may also be concluded that increasing the water:reactive powders ratio (compare the two left columns) has the effect of improving nailability. Thus, increasing the water to reactive powders ratio may be used to provide the improvement possible with polymer spheres. Alternatively, both approaches may be combined as desired.

While the present invention has been described with reference to one or more particular embodiments, those skilled in the art will recognize that many changes may be made thereto without departing from the scope of the present invention. Each of these embodiments and variations thereof is contemplated as falling within the scope of the claimed invention, which is set forth in the following claims.

What is claimed is:

1. A reinforced panel for resisting shear loads when fastened to framing comprising: a continuous phase resulting from the curing of an aqueous mixture of reactive powders comprising, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan, said continuous phase being uniformly reinforced with alkali-resistant glass fibers and containing uniformly distributed ceramic microspheres, said spheres having an average diameter of about 10 to 500 microns (micrometers), said panel having a shear rating of at least 720 lbs/ft (1072 kg/m) when a 0.5 inch (12.7 mm) thick panel tested according to ASTM E72 test method using 8d common nails as fasteners with a fastener spacer of 6 inches (152 mm) on center at the perimeter and 12 inches (304 mm) on center on the intermediate studs.

2. A panel of claim 1, wherein said panel has a thickness of about ¼ to 1 inches (6.3 to 25.4 mm).

3. A panel of claim 1, wherein a 0.5 inch (12.7 mm) thick panel when tested according to ASTM 661 and APA S-1 test methods over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb (90.9 kg) load.

4. A panel of claim 1, wherein said ceramic spheres are hollow and comprise about 50 to 75 wt. % silica, about 15 to 40 wt. % alumina, and up to 35 wt. % of other materials.

5. A panel of claim 1, wherein said glass fibers are monofilaments having a diameter of about 5 to 25 microns (micrometers) and a length of about 0.25 to 3 inches (6.3 to 76 mm).

6. A panel of claim 1, wherein a 4×8 ft., ½ inch thick panel (1.31×2.62 m, 12.7 mm thick) weighs no more than 99 lbs (44.9 kg).

7. A panel of claim 1, wherein said hydraulic cement is Portland cement.

8. A panel of claim 1, wherein said panel has been formed from 35 to 58 wt. % of said reactive powders, 6 to 17 wt. % of said glass fibers, and 34 to 49 wt. % of said ceramic microspheres, each on a dry basis.

9. A panel of claim 8, wherein said panel has been formed from 49 to 56 wt. % of said reactive powders, 7 to 12 wt. % of said glass fibers, and 35 to 42 wt. % of said ceramic microspheres, each on a dry basis.

10. A panel of claim 1, wherein said active pozzolan is at least one member of the group consisting of silica fume, metakaolin, ground granulated blast furnace slag, and pulverized fly ash.

11. A panel of claim 10, wherein said active pozzolan is silica fume.

12. A panel of claim 10, wherein said active pozzolan is metakaolin.

13. A panel of claim 1, wherein said panel further comprises uniformly distributed polymer spheres having an average diameter of about 10 to 350 microns (micrometers).

14. A panel of claim 1 or 13, wherein said panel has been formed from curing an aqueous mixture of said reactive powders wherein the ratio of water-to-reactive powder is from greater than 0.6/1 to 0.7/1, thereby improving nailability of said panel.

15. A panel of claim 13, wherein said panel is formed from 42 to 68 wt. % of said reactive powders, 5 to 15 wt. % of said glass fibers, 23 to 43 wt. % of said ceramic spheres, and up to 1.0 wt. % of said polymer spheres, each on a dry basis.

16. A panel of claim 15, wherein said panel is formed from 54 to 65 wt. % of said reactive powders, 6 to 10 wt. % of said glass fibers, 25 to 35 wt. % of said ceramic spheres, and 0.5 to 0.8 wt. % of said polymer spheres, each on a dry basis.

17. A multilayer panel having a core comprising a panel of claims 1 or 13 further comprising at least one outer layer each of said outer layer(s) comprising a continuous phase resulting from the curing of an aqueous mixture of reactive powders comprising, on a dry basis, 35 to 75 wt. % calcium sulfate alpha hemihydrate, 20 to 55 wt. % hydraulic cement, 0.2 to 3.5 wt. % lime, and 5 to 25 wt. % of an active pozzolan, said continuous phase being uniformly reinforced with alkali-resistant glass fibers and having reduced phase density resulting from either uniformly distributed polymer spheres having an average diameter of about 10 to 350 microns (micrometers) or resulting from a water-to-reactive powders ratio in the range of 0.6/1 to 0.7/1, or a combination thereof in forming said outer layer(s), said continuous phase of said outer layers optionally containing ceramic spheres, said panel having a shear rating of at least 720 lbs/ft (1072 kg/m) when a 0.5 inch (12.7 mm) thick panel tested according to ASTM E72 test method using 8d common nails as fasteners with a fastener spacer of 6 inches (152 mm) on center at the perimeter and 12 inches on center on the intermediate studs.

18. A panel of claim 17, wherein said outer layer(s) has been formed from 42 to 68 wt. % of said reactive powders, 5 to 15 wt. % of said glass fibers, up to 1.0 wt. % of said polymer spheres, and 23 to 43 wt. % of said ceramic spheres, each on a dry basis.

19. A panel of claim 17, wherein said outer layers have been formed from 54 to 65 wt. % of said reactive powders, 6 to 10 wt. % of said glass fibers, 0.5 to 0.8 wt. % of said polymer spheres, and 25 to 35 wt. % of said ceramic spheres, each on a dry basis.

20. A panel of claim 17, wherein said outer layers have a thickness of about 1/32 to 4/32 inches (0.8 to 3.2 mm).

21. A panel of claim 17, wherein said polymer microspheres are made of at least one member of the group consisting of polyacrylonitrile, polymethacrylonitrile, polyvinyl chloride and polyvinylidene chloride, and optionally coated with powders selected from the group consisting of calcium carbonate, titanium oxide, mica, silica and talc.

22. A panel of claim 1, wherein the flexural strength of a panel having a dry density of no more than 65 lb/ft$^3$ (1041 kg/m$^3$) after being soaked in water for 48 hours is at least 1700 psi (11.7 MPa) as measured by the ASTM C 947 test.

23. A panel of claim 17, wherein the edges are shaped to permit adjacent panels to provide tongue-and-groove construction.

24. A panel of claim 17, wherein each of said outer layer(s) has been formed from curing an aqueous mixture of said reactive powders wherein the ratio of water-to-reactive powder is from greater than 0.6/1 to 0.7/1, thereby improving nailability of said panel.

25. A panel of claim 17, wherein the core of said panel has a higher strength than said outer layer(s).

26. A panel of claim 17, wherein said reactive powders comprise 0.2 to 3.5 wt. % lime.

27. A panel of claim 17, wherein said reactive powders comprise 45 to 65 wt. % calcium sulfate hemihydrate, 25 to 40 wt. % hydraulic cement, 0.75 to 1.25 wt. % lime, and 10 to 15 wt. % of an active pozzolan.

* * * * *